UNITED STATES PATENT OFFICE.

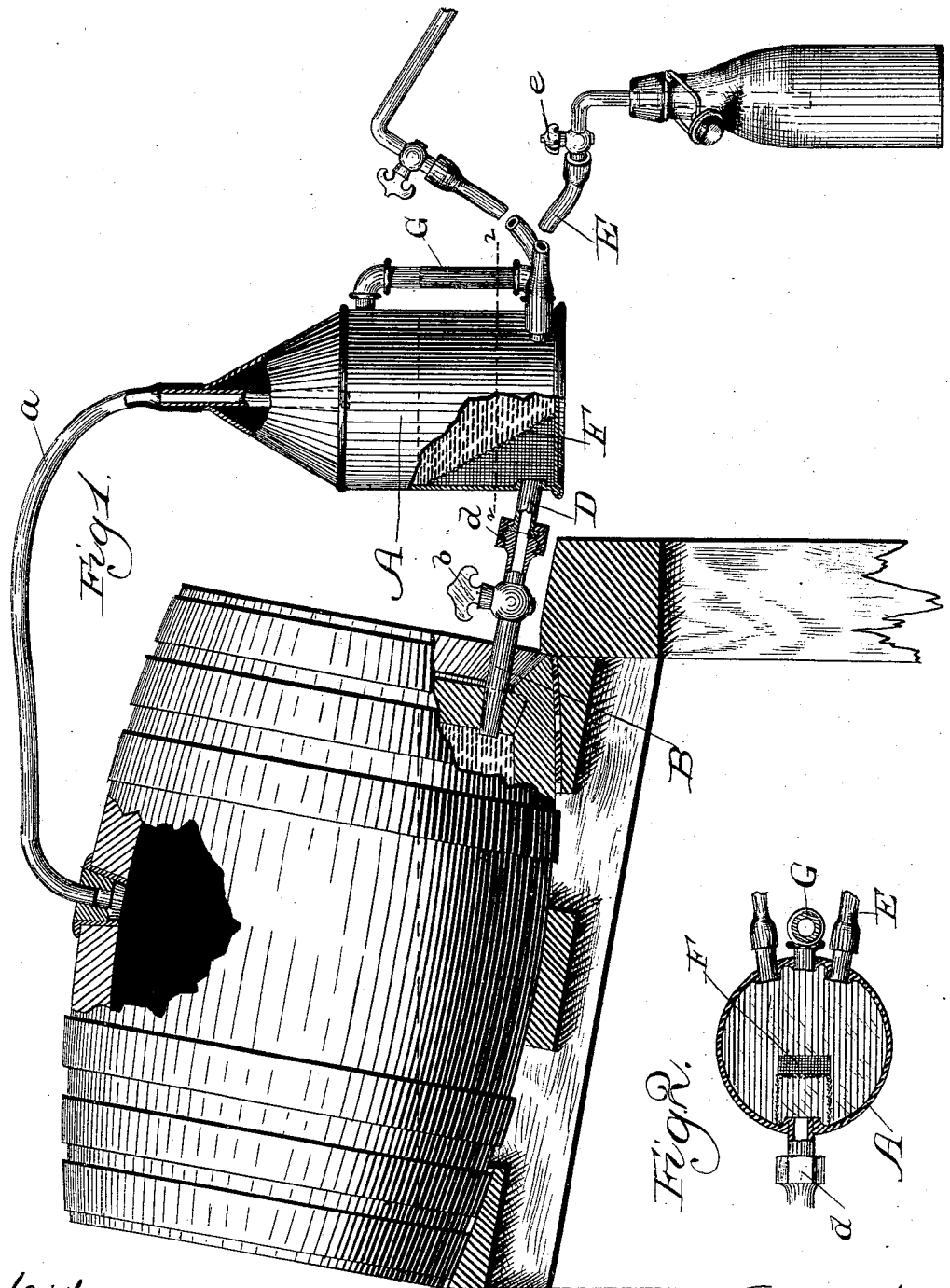

GEORGE A. KINTZ, OF CHICAGO, ILLINOIS.

BOTTLE-FILLING DEVICE.

SPECIFICATION forming part of Letters Patent No. 308,364, dated November 25, 1884.

Application filed March 21, 1884. (No model.)

*To all whom it may concern:*

Be it known that I, GEORGE A. KINTZ, of Chicago, Illinois, have invented certain new and useful Improvements in Bottle-Filling Devices, of which the following is a specification.

In the usual method of drawing off beer and other liquors from barrels into bottles, a rubber tube or hose is employed, one end of the hose being inserted through the bung-hole of the barrel and dropped almost or quite through the liquid to the opposite side of the vessel. The attendant then applies the free end of the hose to his mouth and by suction starts the flow of the liquor. The free end of the hose is then inserted in the bottle, whose mouth is kept below the level of the liquid in the cask, and the liquid flows until the bottle is filled. It is also common to use two pieces of hose, so that two bottles can be filled simultaneously. This method is objectionable for the following, among other, reasons: The whole bung is usually removed to insert the hose, and the hose not being as large as the bung-hole, the carbonic-acid gas accumulated in the vessel is allowed to escape around the hose. The dropping of the hose into the beer stirs up the sediment on the bottom of the cask, and this, together with the foam and other floating particles of the beer, forces its way through the inflow-opening of the hose, and in a short time so clogs it as to prevent the flow of the liquid, thus rendering the removal of the hose for frequent cleansing necessary. Besides this, the sediment of the beer is allowed to pass freely into the bottles through the hose. A further and serious objection to this method of bottling is that the attendant is frequently under the necessity of suspending work, thus stopping the flow of the liquid, and he must again apply suction by his mouth to start the flow when work is resumed, and thus he is obliged many times in the course of a day's work to draw into his mouth the foam, sediment, and gases of the beer, as well as the beer itself. This is not only exceedingly unpleasant, but is injurious to the health. My improved bottling and straining device overcomes all these objections and reduces the amount and unpleasantness of the work of the attendant to a minimum.

To these ends my invention consists, principally, of a receiving-chamber or pressure-vessel interposed between the cask holding the liquid and the bottles to be filled, said chamber being connected with the keg by suitable lead and pressure pipes, and being provided with hose through which the liquid passes to the bottle.

The invention further consists in constructing a strainer intermediate the cask and the bottle, through which strainer the liquor passes; in providing a gage or indicator to show the amount of liquid remaining in the cask, and in certain details of construction hereinafter more particularly described and claimed.

In the accompanying drawings, Figure 1 is a side elevation of my improved bottling and straining device applied to a cask, one of the nozzles of the outflow-pipe being inserted in a bottle, and Fig. 2 is a longitudinal transverse section taken on line 2 2 of Fig. 1.

In construction, the receiving chamber or vessel A may be made with a cylindrical body and conical top and of the size proportioned to the usual size of the packages in connection with which it is used. It should be strong and well made, as there is considerable gas-pressure within it. A pressure-pipe, $a$, leads from the top of the vessel A to the bung-hole of the cask containing the liquid, and a small aperture should be made in the bung, and pipe $a$ accurately fitted therein, so as to prevent the escape of the gas. The pipe $a$ should extend down into vessel A in order to prevent the clogging of the pipe by the foam accumulated in vessel A. The cask holding the liquid should, for convenience' sake, lie on its side. The spigot-hole in the end of the cask is provided with a faucet, B, having a stop-cock, $b$, and the exterior of its outer end threaded. A short lead-pipe, D, is provided near the bottom of vessel A, and has its outer end threaded, and a coupling, $d$, secures pipe D and faucet B together. One or more outflow-pipes, E, form the connection between vessel A and the bottles to be filled. A section of pipe, E, is made preferably of rubber hose, and a nozzle is provided at the end of such flexible portion. A stop-cock, $e$, secured upon the bent portion of the nozzle, allows the flow of the liquid to be checked while transferring the nozzle from one bottle to another during the work. These pipes E are usually made longer than they are represented in the drawings, and this is indicated by the broken lines on the drawings.

To provide for thoroughly straining the liquid on its passage from the cask to the bottle, I construct a strainer, F, of wire-cloth or other suitable material, and so locate it that the beer will pass through it. I have located this strainer upon the interior of the vessel A; but it is obvious that it may be formed integral with the side of said chamber, or located at any other convenient point so long as the beer is passed through it after leaving the cask and before entering the vessel.

As it is convenient to know approximately the quantity of liquor remaining in the vessel at any given time, I have constructed a glass gage, G, and attached it to the vessel A. The quantity of liquor in the cask and in the vessel A will thus be indicated in the gage G, into which of course the liquid is permitted to flow freely. The relative proportion of the receiving-vessel to the cask being ascertained, a scale may be marked upon the gage G, and thus the exact quantity of liquid in the vessel known at any time.

In operation, the several devices being arranged substantially as shown, and the beer permitted to flow into the vessel A, the pressure of the carbonic-acid gas exerted through pressure-pipe $a$ will cause the beer to flow continuously through the outflow-pipe E into the bottles, thus dispensing with all necessity of suction to start the flow of the liquid.

I am aware that devices for filling bottles with liquid by means of air-pressure contained in pipes have heretofore been patented—as, for instance, to Albertson in Letters Patent of the United States No. 282,481—and hence I do not intend to claim, broadly, a bottle-filling device employing air-pressure for forcing the liquid from an interposed vessel into the bottles to be filled.

I am also aware that a bottle-filling device wherein a receiving-vessel is interposed between the cask containing the liquid and the bottle to be filled, and having a lead-pipe and an outflow-pipe, has been patented to Clark in British Patent No. 3,097 of 1874, and such device I therefore disclaim.

I claim—

1. In a bottle-filling device, a receiving-vessel interposed between the cask containing the liquid and the bottle to be filled, a lead-pipe and a pressure-pipe each directly connecting the receiving-vessel and the cask, and an outflow pipe or pipes, all substantially as described.

2. In a bottle-filling device, the combination of a receiving-vessel, A, pressure-pipe $a$, and lead-pipe D, said pipes directly connecting the receiving-vessel and the cask, and an outflow-pipe, E, having a stop-cock, all substantially as described, and for the purpose set forth.

GEORGE A. KINTZ.

Witnesses:
T. F. GRIFFITH,
C. C. LINTHICUM.